US008570545B2

(12) United States Patent
Okunishi et al.

(10) Patent No.: US 8,570,545 B2
(45) Date of Patent: Oct. 29, 2013

(54) IMAGE FORMING APPARATUS HAVING A PLURALITY OF IMAGE FORMING UNITS, INITIAL ADJUSTMENT METHOD FOR THE IMAGE FORMING APPARATUS, AND COMPUTER READABLE MEDIUM RECORDING PROGRAM FOR CAUSING THE IMAGE FORMING APPARATUS TO PERFORM INITIAL ADJUSTMENT

(75) Inventors: Kazuo Okunishi, Okazaki (JP); Hideo Mae, Okazaki (JP); Junichi Taniguchi, Hoi-gun (JP); Koichi Takeuchi, Gamagoori (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1318 days.

(21) Appl. No.: 12/034,444

(22) Filed: Feb. 20, 2008

(65) Prior Publication Data
US 2009/0059246 A1    Mar. 5, 2009

(30) Foreign Application Priority Data
Aug. 28, 2007    (JP) .................................. 2007-221150

(51) Int. Cl.
*G06K 15/00*    (2006.01)

(52) U.S. Cl.
USPC ........ 358/1.14; 358/1.15; 358/1.16; 358/518; 399/24; 399/25; 399/26; 399/9; 399/12; 399/27; 399/39; 399/58; 347/140; 347/19; 702/184; 714/48

(58) Field of Classification Search
USPC ........... 358/1.15, 1.14, 1.16, 518; 399/24, 25, 399/26, 9, 12, 27
See application file for complete search history.

(56) References Cited

U.S. PATENT DOCUMENTS 5,710,956 A   1/1998 Kurohata et al.
7,194,212 B2  3/2007 Kumai et al.

FOREIGN PATENT DOCUMENTS

| JP | 2-236614 | 9/1990 |
|----|----------|--------|
| JP | 08-087213 | 4/1996 |
| JP | 8-87214 | 4/1996 |
| JP | 2001-005344 | 1/2001 |
| JP | 2001-066842 | 3/2001 |
| JP | 2001-092196 | 4/2001 |

(Continued)

OTHER PUBLICATIONS

Japanese Notice of Grounds of Rejection mailed Jan. 12, 2010, directed at counterpart Japanese Application No. 221150/2007; 6 pages.

(Continued)

*Primary Examiner* — Paul F Payer
(74) *Attorney, Agent, or Firm* — Morrison & Foerster LLP

(57) ABSTRACT

An image forming apparatus includes a main body storage part, a determination part, and an initial adjustment part. The first image forming unit includes a first storage part storing first information indicative of whether or not an initial adjustment of the first image forming unit has been completed. The determination part determines whether or not the first information stored in the first storage part and the second information stored in the main body storage part satisfy respective prescribed conditions. The initial adjustment part causes the first and second image forming units to perform the initial adjustment when the first information indicates that the initial adjustment of the first image forming unit has not been completed and the second information indicates that the second image forming unit corresponds to an unused state.

15 Claims, 11 Drawing Sheets

(56) References Cited

FOREIGN PATENT DOCUMENTS

| JP | 2001-312109 | | 11/2001 |
|---|---|---|---|
| JP | 2002-055588 | * | 2/2002 |
| JP | 2002-55588 | | 2/2002 |
| JP | 2003-241590 | | 8/2003 |
| JP | 2005-134651 | * | 5/2005 |
| JP | 2005-326729 | | 11/2005 |

OTHER PUBLICATIONS

Japanese Office Action mailed Aug. 25, 2009, directed to corresponding Japanese Application No. 2007-221150; 7 pages.

* cited by examiner

FIG.4

| ADDRESS | CONTENT | |
|---|---|---|
| 0 | UNIT ID | 151K |
| 8 | UNIT IDENTIFICATION INFORMATION | |
| | . | |
| | . | |
| 20 | INITIAL ADJUSTMENT INFORMATION | |
| | . | |
| | . | |
| 40 | USAGE HISTORY INFORMATION | |
| | . | |
| | . | |
| | . | |
| | . | |
| | . | |
| | . | |
| | . | |
| | . | |
| | . | |
| | . | |
| | . | |
| | . | |
| 63 | . | |

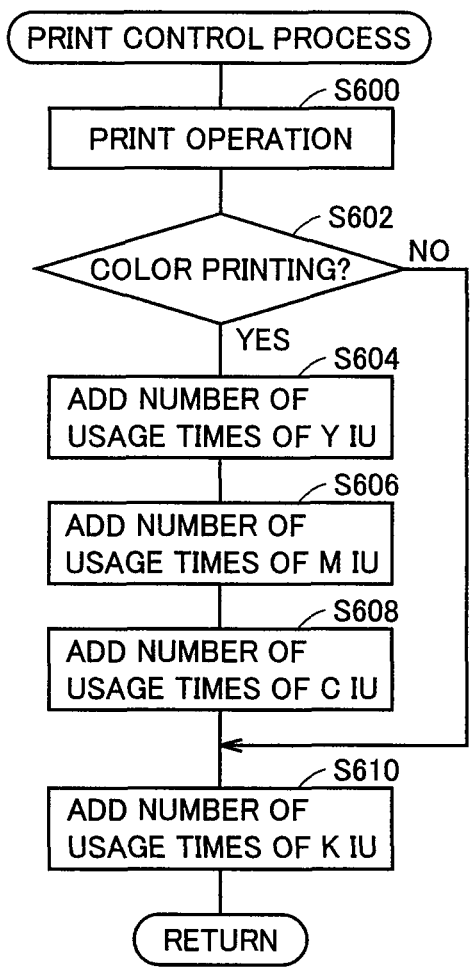

IMAGE FORMING APPARATUS HAVING A PLURALITY OF IMAGE FORMING UNITS, INITIAL ADJUSTMENT METHOD FOR THE IMAGE FORMING APPARATUS, AND COMPUTER READABLE MEDIUM RECORDING PROGRAM FOR CAUSING THE IMAGE FORMING APPARATUS TO PERFORM INITIAL ADJUSTMENT

This application is based on Japanese Patent Application No. 2007-221150 filed with the Japan Patent Office on Aug. 28, 2007, the entire content of which is hereby incorporated by reference.

BACKGROUND OF THE INVENTION

1. Field of the Invention

The present invention relates to an image forming apparatus that forms an image by operating a plurality of image forming units, an initial adjustment method for the image forming apparatus, and a computer readable medium recording a program for causing the image forming apparatus to perform initial adjustment.

2. Description of the Related Art

An image forming unit constituting an image forming apparatus includes, as an important unit, an imaging unit. The imaging unit generally includes a charger, a photoconductor, a development roller, a developer agent, a cleaning unit and the like. An imaging unit that includes a two-component developer agent in which toner and carrier are mixed has a TCR (Toner/Carrier Ratio) sensor for detecting the concentration ratio between toner and carrier.

Generally, the photoconductor and/or the developer agent slightly deteriorate every time image formation is performed, and ultimately, the quality of an image formed by the imaging unit starts to deteriorate. When the deterioration in the image quality reaches an unacceptable level, the user determines that the members constituting the image forming unit (such as the photoconductor and the developer agent) has reached their end of life and replaces the members.

Recently, an image forming apparatus of which imaging unit itself is replaced for simplifying the replacement works has commonly been used. When a TCR sensor is contained in the imaging unit, the TCR sensor is also replaced with a new TCR sensor at the same time when the imaging unit is replaced. When the TCR sensor is arranged on the image forming apparatus side, the replacement may cause shift in the positional relationship between the TCR sensor and the imaging unit due to assembly tolerance or the like.

That is, due to the replacement of the imaging unit itself or the change in the positional relationship between a detection target in the imaging unit and the TCR sensor, the detection performance of the TCR sensor may become different between before and after the replacement of the imaging unit. Accordingly, when replacing the imaging unit, it is necessary to perform an initial adjustment in order to agitate toner in the imaging unit and/or to adjust the TCR sensor. In other words, the purpose of the initial adjustment is to correct for variation in concentration due to the replacement of the photoconductor and/or the developer agent and to correct for color drift due to the replacement of the imaging unit, i.e., to stabilize an image.

As a method of performing the initial adjustment, for example, Japanese Laid-Open Patent Publication No. 08-087213 discloses an image forming apparatus in which, when it is determined that it is a state where the apparatus is installed based on a machine-new-status value indicative of the state of the apparatus, after a hopper is supplied with toner, an initialization process (a NEW unit sequence), which is a process performed when each unit is new, is performed. With such an image forming apparatus, the initialization process at the installation is automated, whereby the burden of the user is largely reduced.

Japanese Laid-Open Patent Publication No. 2003-241590 discloses an image forming apparatus in which a during-initial-setting-operation flag is set for determining whether or not an initial setting operation of a new process cartridge is completed. In the image forming apparatus, firstly, before a new process cartridge is attached to a new image forming apparatus, for example, before the image forming apparatus is shipped from the factory, the during-initial-setting-operation flag is set in advance to an initial-setting-operation-not-completed state. Thereafter, the new process cartridge is attached to the image forming apparatus. Then, when the main power supply of the image forming apparatus is turned on, the initial setting operation of the process cartridge is performed. Here, until the initial setting operation normally ends, the during-initial-setting-operation flag is maintained to be the initial-setting-operation-not-completed state. When the initial setting operation normally ends, the during-initial-setting-operation flag is set to an initial-setting-operation-completed state.

Japanese Laid-Open Patent Publication No. 2001-005344 discloses an image forming apparatus in which, for each color of magenta (M), cyan (C), and yellow (Y), image stabilizing control that can be executed in monochrome mode is executed in monochrome mode and not basically executed when switching the mode, whereby the time of image stabilizing control when switching the mode is reduced.

Japanese Laid-Open Patent Publication No. 2001-066842 discloses an image forming apparatus in which, when printing is performed in monochrome mode, firstly, it is determined whether or not the timing of executing an image stabilizing adjustment in monochrome mode has come, based on whether or not the number of image forming times Nm in monochrome mode is not less than threshold value $N2$. If the timing has come, then whether or not an original for which an image is to be formed is monochrome is checked and the number of pages Ne thereof is counted. When it is expected that printing in color mode will be performed before the next timing of the image stabilizing adjustment in monochrome mode comes, an image stabilizing adjustment in color mode is performed even if it is during printing in monochrome mode.

Japanese Laid-Open Patent Publication No. 2001-092196 discloses an image forming apparatus in which, when timing of an image stabilizing adjustment has come when monochrome mode is set, firstly, the number of image forming times M in monochrome mode before entering next color mode and threshold value N for determining the timing of the image stabilizing adjustment are compared with each other. If $M \leq N$, then based on that image formation in color mode is to be performed before the timing of next image stabilizing adjustment, flag $F=1$ is set so that the image stabilizing adjustment in color is performed in advance. If $N<M$, then only when $M \leq 2N$ and the number of image forming times L in monochrome mode after previous image formation in color mode (including formation of a reference pattern of the image stabilizing adjustment) is greater than prescribed value P, flag $F=1$ is set so that the charging state of color toner is recovered in advance.

Past image forming apparatuses before the above-described image formation apparatuses were proposed employed a scheme in which a serviceman or the user performed the initial adjustment with an operation screen or the like, instead of including means for detecting replacement of the imaging unit. The image forming apparatuses employing such a scheme were often of the type in which replacement of the imaging unit was carried out by a "service engineer" or a "special user trained as a manager of the apparatus". Such image forming apparatuses were configured to allow the "service engineer" to perform the initial adjustment by a special operation with the operation screen so that general users did not inadvertently perform the initial adjustment.

However, recently, color image forming apparatuses have been in wide use owing to their reduced price, for example, and therefore it has increasingly been necessary for a general user to replace the imaging unit. Accordingly, image forming apparatuses automatically performing the initial adjustment by identifying whether or not the initial adjustment of the imaging unit has already been performed have been coming into common use.

In the color image forming apparatus for use by a general user, color printing is less frequently performed as compared with the color image forming apparatus for professional use. Therefore, the life of the color imaging units and that of the color image forming apparatus itself are often approximately the same. This is because the user hopes to suppress the printing costs and does not perform all printing in color even with the color image forming apparatus. That is, since the color imaging units wear less (less frequently used) than the black imaging unit, the life of each color imaging unit is often longer than that of the black imaging unit. In the color image forming apparatuses of most users, the life of each color imaging unit is longer than that of the color image forming apparatus. Thus, such a user replaces the black imaging unit only until the end of the life of the color image forming apparatus.

That is, in most color image forming apparatuses, the color imaging units are not replaced until the end of the color image forming apparatus. The color imaging units are replaced only in a color image forming apparatus of a user who requires far greater pages to be printed in color relative to the average color printing pages/monochrome printing pages ratio, and/ or in a failed color image forming apparatus. For example, provided that the printing yield (machine life) of an image forming apparatus is 200,000 pages and that of each imaging unit is 40,000 pages, and used by a person who performs color printing at the ratio not more than 20%, the color imaging units will not be replaced. On the other hand, the black imaging unit will be replaced four times, except for the first setup.

Under the circumstances, in order to reduce the costs for the color imaging units, an image forming apparatus has been realized in which a user can perform the initial adjustment of the color imaging units with an operation panel or the like while nonvolatile memory for storing information as to whether or not the initial adjustment has been completed is omitted from each color imaging unit. In such type of image forming apparatus, only the black imaging unit of which replacement frequency is relatively great includes nonvolatile memory for allowing the image forming apparatus to recognize whether or not the initial adjustment has been completed, and based on that recognized information, the initial adjustment is automatically performed.

On the other hand, such an image forming apparatus involves the following problems. In a general initial adjustment of the imaging unit, after an automatic adjustment of the TCR sensor is performed, image stabilizing work for adjusting color drift, tone reproduction and the like is performed. More specifically, when the user sets all imaging units to the image forming apparatus, the image forming apparatus obtains information as to whether or not an initial adjustment of the black imaging unit has already been completed from nonvolatile memory of the black imaging unit. Then, after the initial adjustment of the initial adjustment of the black imaging unit is completed, a serviceman or the like activates an initial adjustment window of each color imaging unit with the operation panel, so that initial adjustment of each color imaging unit is performed.

That is, the initial adjustment is automatically performed for the black imaging unit for which information as to whether or not the initial adjustment has already been completed is stored, the initial adjustment must be manually performed for the color imaging units.

When the black imaging unit and the color imaging units each have nonvolatile memory for detecting information as to whether or not the initial adjustment has been completed, the image forming apparatus is allowed to recognize which imaging unit has its initial adjustment completed. Therefore, all of the imaging units can automatically have their initial adjustment (in particular, the agitation process) performed substantially at the same time. However, the above-described omission of the detection means from the color imaging units limits activation conditions for performing the initial adjustment, and the initial adjustment must be separately performed for the black imaging unit and for the color imaging units. Thus, the time required for the initial adjustment is increased. In particular, since the agitation process requires several minutes to be completed, the imaging units that require agitation must start the agitation process at the same time, or inconveniently the initial adjustment takes enormous time.

SUMMARY OF THE INVENTION

Accordingly, a main object of the present invention is to provide an image forming apparatus having a plurality of image forming units, an initial adjustment method for the image forming apparatus, and a computer readable medium recording program for causing the image forming apparatus to perform an initial adjustment, which are capable of extracting the timing at which the initial adjustment is required for each imaging unit and completing the initial adjustment quickly, even when at least one of the plurality of imaging units attached to the image forming apparatus does not include a storage part.

According to one aspect of the present invention, an image forming apparatus is provided. The image forming apparatus includes a main body including a main body storage part; a first image forming unit removably attached to the main body; a second image forming unit removably attached to the main body; a determination part; and an initial adjustment part. The first image forming unit includes a first storage part storing first information indicative of whether or not an initial adjustment of the first imaging forming unit has been completed. The main body storage part stores second information indicative of a usage history of the second image forming unit. The determination part determines whether or not the first information stored in the first storage part and the second information stored in the main body storage part satisfy respective prescribed conditions. The initial adjustment part causes the first and second image forming units to perform the initial adjustment when the first information indicates that the initial adjustment of the first image forming unit has not been completed and the second information indicates that the second image forming unit corresponds to an unused state.

Preferably, the initial adjustment part causes only the first image forming unit to perform the initial adjustment when the first information indicates that the initial adjustment of the first image forming unit has not been completed and the second information indicates that the second image forming unit corresponds to a used state.

Preferably, the usage history includes number of usage times of the second image forming unit. The determination part determines that the second image forming unit corresponds to the unused state when the number of usage times is smaller than a preset threshold value.

Preferably, the image forming apparatus further includes an update part. The update part updates, when the initial adjustment of the first image forming unit is completed, the first information stored in the first storage part to a content indicating that the initial adjustment of the first image forming unit has been completed.

Preferably, the first image forming unit is an image forming unit for black, and the second image forming unit is an image forming unit for color.

According to another aspect of the present invention, an initial adjustment method for an image forming apparatus is provided. The image forming apparatus includes a main body including a main body storage part, a first image forming unit removably attached to the main body and including a first storage part, and a second image forming unit removably attached to the main body. The initial adjustment method includes the steps of storing in the first storage part first information indicative of whether or not an initial adjustment of the first imaging forming unit has been completed; storing in the main body storage part second information indicative of a usage history of the second image forming unit; determining whether or not the first information stored in the first storage part and the second information stored in the main body storage part satisfy respective prescribed conditions; and causing the first and second image forming units to perform the initial adjustment when the first information indicates that the initial adjustment of the first image forming unit has not been completed and the second information indicates that the second image forming unit corresponds to an unused state.

Preferably, the step of causing the first and second image forming units to perform the initial adjustment includes a step of causing only the first image forming unit to perform the initial adjustment when the first information indicates that the initial adjustment of the first image forming unit has not been completed and the second information indicates that the second image forming unit corresponds to a used state.

Preferably, the usage history includes number of usage times of the second image forming unit. The step of determining includes a step of determining that the second image forming unit corresponds to the unused state when the number of usage times is smaller than a preset threshold value.

Preferably, the initial adjustment method further includes a step of updating, when the initial adjustment of the first image forming unit is completed, the first information stored in the first storage part to a content indicating that the initial adjustment of the first image forming unit has been completed.

Preferably, the first image forming unit is an image forming unit for black, and the second image forming unit is an image forming unit for color.

According to a still another aspect of the present invention, a computer readable medium storing a program for causing an image forming apparatus to perform an initial adjustment is provided. The image forming apparatus includes a main body including a main body storage part, a first image forming unit removably attached to the main body and including a first storage part, a second image forming unit removably attached to the main body, and a controller controlling operations of the image forming apparatus. The program causes the controller to perform the steps of: storing in the first storage part first information indicative of whether or not an initial adjustment of the first imaging forming unit has been completed; storing in the main body storage part second information indicative of a usage history of the second image forming unit; determining whether or not the first information stored in the first storage part and the second information stored in the main body storage part satisfy respective prescribed conditions; and causing the first and second image forming units to perform the initial adjustment when the first information indicates that the initial adjustment of the first image forming unit has not been completed and the second information indicates that the second image forming unit corresponds to an unused state.

Preferably, the step of causing the first and second image forming units to perform the initial adjustment includes a step of causing only the first image forming unit to perform the initial adjustment when the first information indicates that the initial adjustment of the first image forming unit has not been completed and the second information indicates that the second image forming unit corresponds to a used state.

Preferably, the usage history includes number of usage times of the second image forming unit. The step of determining includes a step of determining that the second image forming unit corresponds to the unused state when the number of usage times is smaller than a preset threshold value.

Preferably, the program further causes the controller to perform a step of updating, when the initial adjustment of the first image forming unit is completed, the first information stored in the first storage part to a content indicating that the initial adjustment of the first image forming unit has been completed.

Preferably, the first image forming unit is an image forming unit for black, and the second image forming unit is an image forming unit for color.

As above, with the image forming apparatus having a plurality of image forming units, the initial adjustment method for the image forming apparatus, and the computer readable medium recording program for causing the image forming apparatus to perform an initial adjustment according to the present invention, even when at least one of the plurality of imaging units attached to the image forming apparatus does not include a storage part, the timing at which the initial adjustment is required for each imaging unit can be extracted and the initial adjustment can be completed quickly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a conceptual view of data stored in a first storage part.

FIG. 12 is a flowchart showing a processing procedure of print control processing.

DESCRIPTION OF THE PREFERRED EMBODIMENTS

Figure 1:
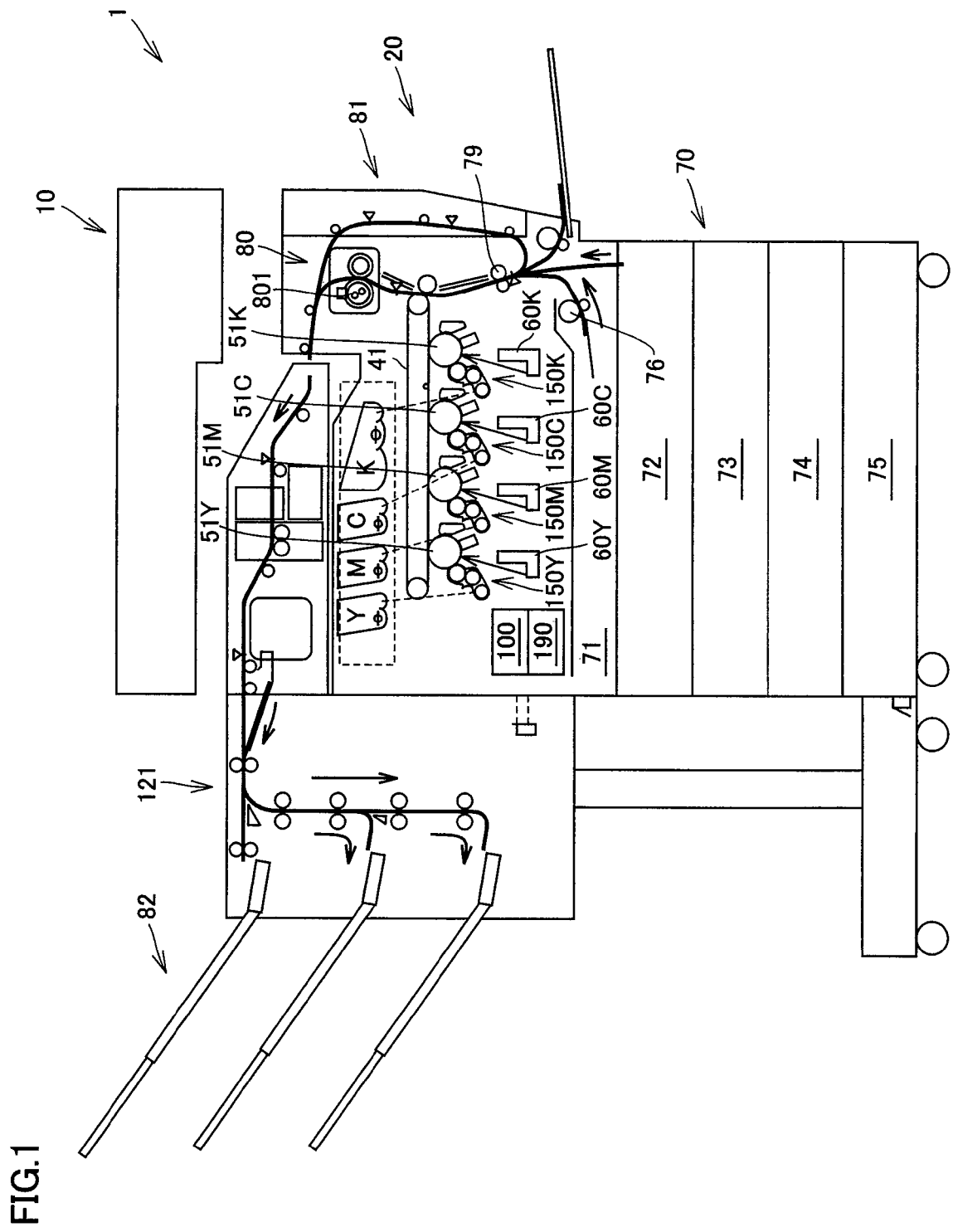
FIG. 1 is a schematic front cross-sectional view of an MFP (Multi Function Peripheral) that is an exemplary image forming apparatus.

In the following, an embodiment of the present invention will be described referring to the drawings. In the following description, the same components are provided with the same reference characters. When such components are the same in their name or function, detailed description thereof will not be repeated. The following description is given as to a tandem type full-color MFP 1 as an exemplary "image forming apparatus" of the present invention. It is noted that, in the following description and the drawings, "K" and "Bk" are the abbreviation of black (black color). "Y" is the abbreviation of yellow (red+green). "M" is the abbreviation of magenta (green+blue). "C" is the abbreviation of cyan (blue+red). In the drawings, an imaging unit is abbreviated as IU.

[Overall Configuration]

First, an overall configuration of MFP 1 according to the present embodiment is described. FIG. 1 is a schematic front cross-sectional view of MFP 1 that is an exemplary image forming apparatus. As shown in FIG. 1, MFP 1 includes an image reading unit 10, an image forming unit 20, an engine control unit 100, and a printer control unit 190. To MFP 1, imaging units 150K, 150Y, 150M, and 150C, which will be described later, are removably attached. Imaging units 150K, 150Y, 150M, and 150C are covered by a not-shown cover (front cover) when attached to MFP 1, to be enclosed in MFP 1.

Image reading unit 10 is a known apparatus that reads an image of an original placed on a not-shown original glass plate by moving a scanner. The image of the original read by light emission of an exposure lamp provided in the scanner is imaged by a condenser lens. It is divided into light of three wavelengths of red (R), green (G) and blue (B) by a spectroscope, and respectively provided to a CCD (Charge Coupled Device) image sensor for red, a CCD image sensor for green, and a CCD image sensor for blue. An output signal from each CCD image sensor (hereinafter simply referred to as the "CCD sensor") is AD (Analog-Digital) converted to be R, G, or B image data of the original.

Thus obtained image data for each color component is subjected to various data processing by engine control unit 100, and further converted into image data of each reproduction color of black (K), yellow (Y), magenta (M), and cyan (C) (in the following, K, Y, M, and C are provided as subscripts to the reference number denoting the constituent components related to respective reproduction colors). The converted image data is stored for each reproduction color in RAM (Random Access Memory) 108 (see FIG. 5) of engine control unit 100 in a main body. Then, reflecting the result of resist correction, which will be described later, the image data is subjected to an image writing position correction process or the like that is required for correcting positional shift. Thereafter, the image data is read on scanning line-by-scanning line basis in synchronization with the supply of transfer papers, and outputted as a driving signal of a laser diode that exposes photoconductor drums 51K, 51Y, 51M, and 51C.

Image forming unit 20 as a main body of MFP 1 is constituted of a transfer belt 41 suspended in image forming unit 20 and driven, imaging units (image forming units) 150K, 150Y, 150M, and 150C for respective colors arranged at prescribed intervals facing to transfer belt 41, exposure scanning units 60K-60C provided for respective imaging units, a feeding unit 70 feeding transfer papers to transfer belt 41, a fixing unit 80 arranged on the downstream side of transfer paper carrying unit 40, and a double side unit 81.

Exposure scanning units 60K-60C include laser diodes receiving the drive signal outputted from engine control unit 100 and emitting laser light, not-shown polygon mirrors for deflecting the laser light for expose-scanning in the main scanning direction over photoconductor drums 51K-51C, respectively.

Feeding unit 70 has feeding cassettes 71-75 each storing transfer papers of different size and orientation, a pickup roller 76 for picking up the feeding papers from each feeding cassette, a resist roller 79 for adjusting the timing of sending the papers to transfer belt 41, and the like.

Figure 2A:
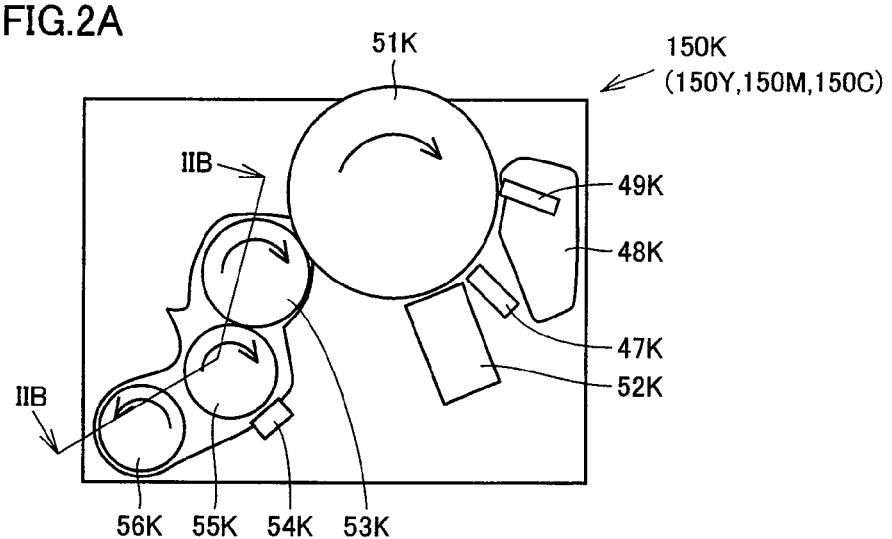
FIGS. 2A and 2B are schematic views of an internal configuration of an imaging unit.
Figure 2B:
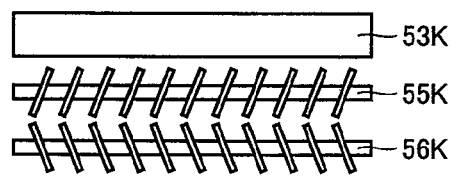

FIGS. 2A and 2B are schematic views of the internal configuration of imaging unit 150K. More specifically, FIG. 2A is a schematic front view of the imaging unit, and FIG. 2B is a view along line IIB in FIG. 2A. As shown in FIGS. 2A and 2B, as one example, imaging unit 150K for black has a photoconductor drum 51K, an eraser 47K arranged around photoconductor drum 51K, a cleaner 48K, a cleaning blade 49K, a charger 52K, a development roller 53K, a TCR sensor 54K, agitation screws 55K and 56K, and the like.

Photoconductor drum 51K has the residual toner on its surface removed by cleaner 48K. After being discharged by eraser 47K, photoconductor drum 51K is evenly charged by charger 52K, and then subjected to exposure. When photoconductor drum 51K as charged is subjected to exposure by the laser light, an electrostatic latent image is formed on the surface of photoconductor drum 51K. Agitation screws 55K and 56K agitate toner and carrier in imaging unit 150K in an initial adjustment process, which will be described later.

The other color imaging units 150Y, 150M, and 150C are similarly configured as black imaging unit 150K, and therefore detailed description is not repeated.

Referring to FIGS. 1, 2A and 2B, the electrostatic latent images of respective colors are developed by development rollers 53K-53C of respective colors, whereby toner images of K, Y, M, and C are formed on the surface of photoconductor drums 51K-51C, respectively. By the action of the transfer charger arranged on the back side of transfer belt 41 at each transfer position, the toner images are sequentially transferred onto transfer papers carried by transfer paper carrying unit 40. Here, the transferring operations of respective colors are performed at different timings from the upstream side to the downstream side, so that the toner images are transferred as overlapped at the identical position on the transfer paper being carried.

The transfer paper having the toner images of respective colors multilayer-transferred thereon is carried to fixing unit 80 by transfer belt 41. A fixing roller 801 in fixing unit 80 includes a heater inside. A CPU (Central Processing Unit) 101 controls electric supply to the heater while detecting the surface temperature of fixing roller 801 with a temperature detecting sensor. The transfer paper is pressurized at a high temperature by fixing roller 801, to have toner particles on its surface fused and fixed thereon. Thereafter, the transfer paper is output on a paper output tray 82.

Engine control unit 100 analyzes image data obtained as a result of reading an original, for example, and controls switching between monochrome mode and color mode and controls the timing or content of the above-described image stabilizing control. The configuration and the processing content of engine control unit 100 will be described later.

Figure 3A:
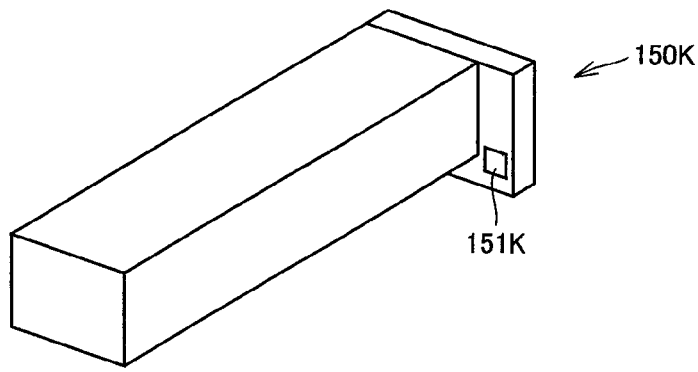
FIGS. 3A and 3B are perspective views of an external configuration of an imaging unit.
Figure 3B:
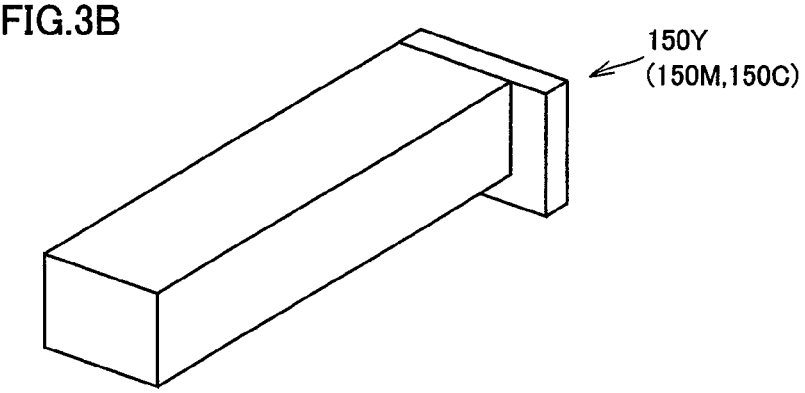

FIGS. 3A and 3B are perspective views showing the external configuration of imaging units 150K, 150Y (150M, 150C). More specifically, FIG. 3A is a perspective view showing imaging unit 150K for black and FIG. 3B is a perspective view showing imaging unit 150Y (150M, 150C) for color. In the present embodiment, as shown in FIGS. 3A and 3B, imaging unit 150K for black includes a first storage part 151K constituted of nonvolatile memory, while imaging unit 150Y (150M, 150C) for color does not include a storage part.

FIG. 4 is a conceptual view of data stored in first storage part 151K of imaging unit 150K. As shown in FIG. 4, first storage part 151K is constituted of nonvolatile memory, and stores unit ID and unit identification information for identifying imaging unit 150K, initial adjustment information including new/old article information indicative of whether or not imaging unit 150K is new, and usage history information including a unit page counter indicative of the number of usage times of black imaging unit 150K (the number of pages printed using black imaging unit 150K).

The "new/old article information" herein is the information indicative of whether or not an initial adjustment of imaging unit 150K has been completed (whether it is in an initial adjustment completed state or an initial adjustment uncompleted state). In first storage part 151K of imaging unit 150K of which initial adjustment has been completed (in "the initial adjustment completed state"), a prescribed value is stored at a prescribed address. When the prescribed value is not stored at the prescribed address of first storage part 151K, MFP 1 determines that the initial adjustment of imaging unit 150K has not been completed (in "the initial adjustment uncompleted state"). That is, by accessing the prescribed address of first storage part 151K, MFP 1 recognizes whether or not the prescribed value is stored, to recognize whether or not the initial adjustment of imaging unit 150K has been completed.

The present embodiment is configured such that, when an initial adjustment of imaging unit 150K is completed, a prescribed value indicative of the completion of the initial adjustment is stored at a prescribed address. Specifically, CPU 101 (see FIG. 5) of MFP 1 main body accesses the prescribed address via an extension I/O (Input/Output) 103 (see FIG. 5) to store the prescribed value and/or to recognize whether or not the prescribed value is stored. Thus, CPU 101 can determine whether or not the initial adjustment of imaging unit 150K has been completed.

[Hardware Configuration]

Figure 5:
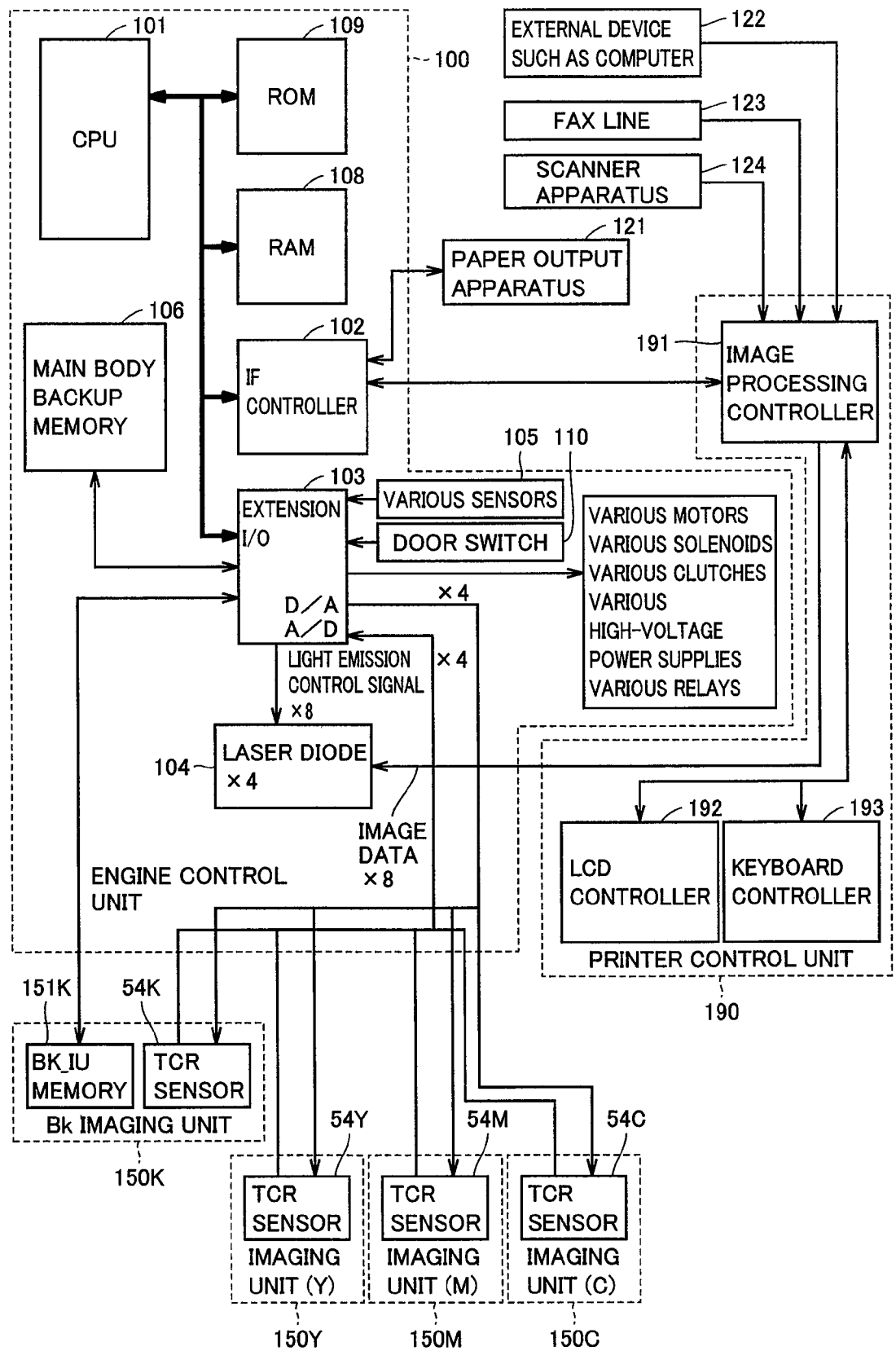
FIG. 5 is a block diagram showing a hardware configuration of an MFP that is an exemplary image forming apparatus.

Next, a hardware configuration of MFP 1 according to the present embodiment is described. FIG. 5 is a block diagram showing a hardware configuration of MFP 1 being an exemplary image forming apparatus. As shown in FIG. 5, MFP 1 according to the present embodiment is constituted of engine control unit 100, printer control unit 190, removably attached imaging units 150K, 150Y, 150M, and 150C, and the like.

Engine control unit 100 includes, around CPU 101, an IF (Interface) controller 102, an extension I/O 103, a laser diode 104, a main body backup memory 106, RAM (Random Access Memory) 108, ROM (Read Only Memory) 109 and the like, which are connected via an internal bus. Through extension I/O 103, CPU 101 is connected to each part of MFP 1 such as various sensors 105, a door switch 110, imaging units 150K-150C, exposure scanning units 60K-60C and the like. Here, door switch 110 is a sensor for detecting open/closed state of the front cover.

CPU 101 as a controller controls each part according to a control program stored in ROM 109. ROM 109 stores various control programs in advance, such as a program for determining whether to set color mode or monochrome mode in accordance with the contents of image data obtained from the original stored in main body backup memory 106 and a program for performing image stabilizing control.

CPU 101 and main body backup memory 106 determine, for example, whether or not to perform the initial adjustment of imaging units 150K, 150Y, 150M, and 150C. CPU 101 is connected, via the extension I/O, to each part such as imaging units 150K-150C, exposure scanning units 60K-60C and the like, and controls imaging units 150K-150C based on pattern image detection signals outputted from various sensors 105 so that imaging units 150K-150C perform the initial adjustment.

RAM 108 is used as a storage area when CPU 101 executes a program. RAM 108 stores the open/closed state of the front cover.

IF controller 102 is connected to a paper output apparatus 121, an image processing controller 191 of printer control unit 190, and the like.

Extension I/O 103 is connected to laser diode 104, imaging units 150K, 150Y, 150M, and 150C attached to MFP 1, and the like.

Printer control unit 190 includes image processing controller 191, an LCD (Liquid Crystal Display) controller 192 controlling a not-shown operation panel, a keyboard controller 193 accepting an instruction (to which an instruction is inputted) from an external source via the not-shown operation panel, and the like. Image processing controller 191 is connected via LAN (Local Area Network) or the like to an external device 122 such as a computer located externally to MFP 1, and also connected to a scanner apparatus 124, a fax line 123, and the like.

[Functional Configuration]

Figure 6:
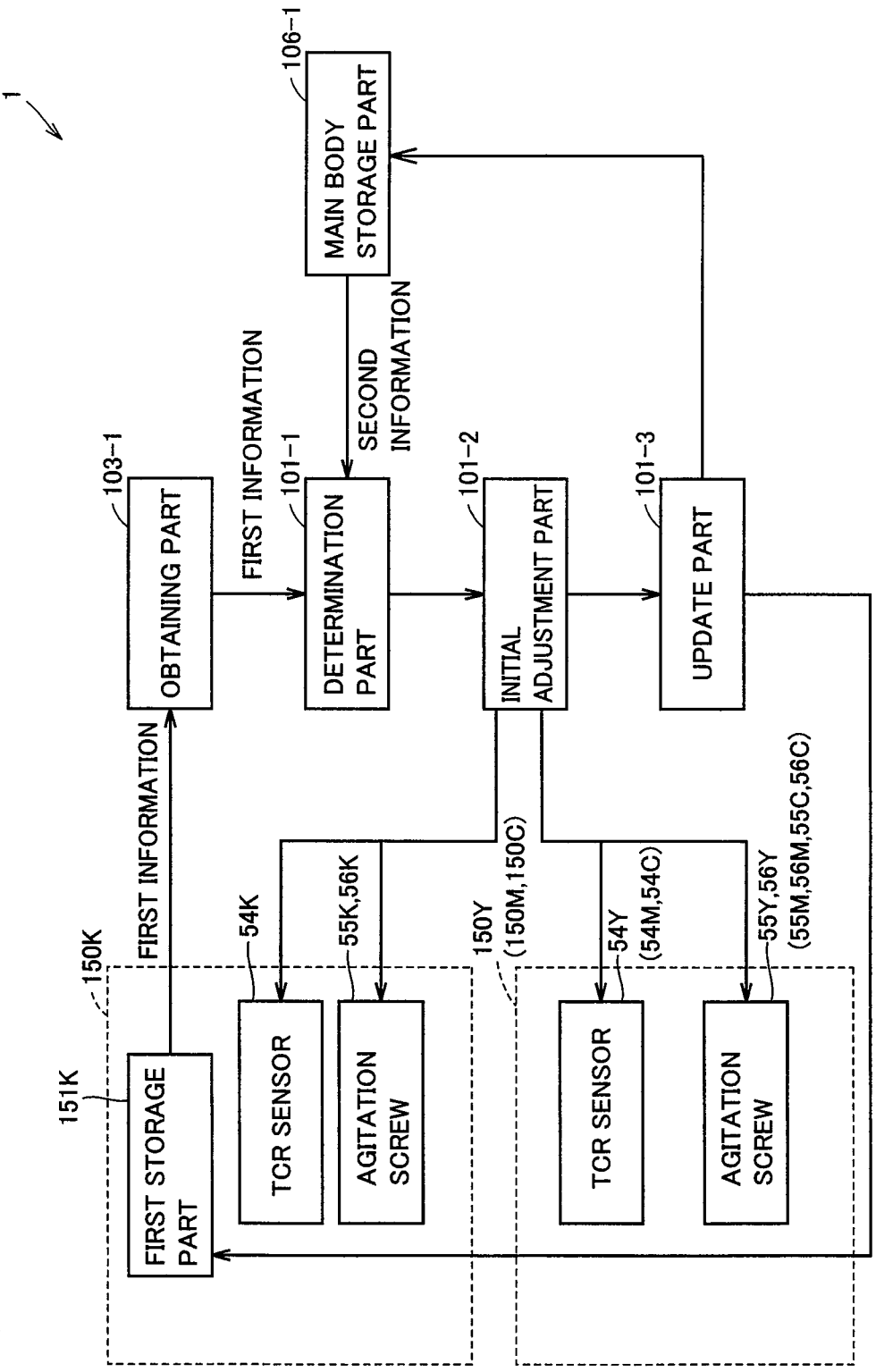
FIG. 6 is a functional block diagram showing a functional configuration of an MFP that is an exemplary image forming apparatus.

Next, a functional configuration of MFP 1 according to the present embodiment is described. FIG. 6 is a functional block diagram showing a functional configuration of MFP 1 being an exemplary image forming apparatus. As shown in FIG. 6, MFP 1 according to the present embodiment includes black imaging unit 150K and color imaging unit 150Y (150M, 150C), an obtaining part 103-1, a determination part 101-1, an initial adjustment part 101-2, an update part 101-3, and a main body storage part 106-1. Black imaging unit 150K includes TCR sensor 54K and agitation screws 55K and 56K, and color imaging unit 150Y (150M, 150C) includes TCR sensor 54Y (54M, 54C) and agitation screws 55Y and 56Y (55M and 56M, 55C and 56C).

Determination part 101-1 is realized by CPU 101 and by information stored in each of ROM 109, main body backup memory 106 and RAM 108. More specifically, determination part 101-1 is realized as a control program stored in ROM 109 is once read into RAM 108, and the program stored in RAM 108 is executed on CPU 101.

Initial adjustment part 101-2 is realized by CPU 101, ROM 109, extension I/O 103 and the like. More specifically, initial adjustment part 101-2 is realized as a control program stored in ROM 109 is once read into RAM 108, and the program stored in RAM 108 is executed on CPU 101, and an instruction requesting an initial adjustment is transmitted via the extension I/O to imaging units 150K and 150Y (150M, 150C).

While MFP 1 according to the present embodiment is configured such that various processes and functions are realized by software executed on CPU 101, instead of the functions of blocks and the processes of steps being realized by software, they may be realized by respective dedicated hardware circuits or the like. In the following, each of the parts is described in detail.

First storage part 151K is realized by nonvolatile memory such as flash memory, and stores first information indicative of whether or not the initial adjustment of black imaging unit 150K (first image forming unit) has been completed. As shown in FIG. 3, in the present embodiment, the first image forming unit represents imaging unit 150K for black that is generally frequently used, and a second image forming unit represents imaging units 150Y, 150M and 150C for color that are generally less frequently used.

Obtaining unit 103-1 is realized by CPU 101 and extension I/O 103 connected to CPU 101 via an internal bus. It is for reading the first information from first storage part 151K when imaging unit 150K is attached to MFP 1.

Main body storage part 106-1 is realized by main body backup memory 106 constituted of nonvolatile memory or the like, or by RAM 108 or the like, and stores second information indicative of the usage history of imaging units 150Y, 150M and 150C (second image forming unit) of respective colors. The "usage history" herein is the information including the number of times imaging units 150Y, 150M and 150C (second image forming unit) of respective colors are used, i.e., the number of pages color-printed by imaging units 150Y, 150M and 150C (second image forming unit) of respective colors.

Determination part 101-1 determines whether or not the first information stored in first storage part 151K satisfies a prescribed condition, and determines whether or not the second information stored in main body storage part 106-1 satisfies a prescribed condition.

More specifically, determination part 101-1 reads the first information stored in first storage part 151K and determines whether or not the first information indicates an "uncompleted state" of the initial adjustment of first imaging unit 150K. When the first information indicates the uncompleted state of the initial adjustment (the first information satisfies the prescribed condition), determination part 101-1 reads the second information from main body storage part 106-1 and determines whether or not the second information indicates an "unused state" (the second information satisfies the prescribed condition).

Further specifically, when the number of times each imaging unit 150Y (150M, 150C) is used is smaller than a preset number of times (e.g., ten times), determination part 101-1 determines that the second information indicates the "unused state". When the number of times each imaging unit 150Y (150M, 150C) is used is not smaller than a preset number of times (e.g., ten times), determination part 101-1 determines that the second information indicates the "used state" (not indicating the "unused state").

Another possible configuration is that determination part 101-1 firstly determines as to the second information, and if the second information satisfies a prescribed condition, determination part 101-1 determines as to whether or not the first information satisfies a prescribed condition.

When determination part 101-1 determines that the first information indicates that the initial adjustment of first image forming unit 150K has not been completed and the second information indicates that second image forming unit 150Y (150M, 150C) corresponds to the unused state, initial adjustment part 101-2 causes black imaging unit 150K and color imaging unit 150Y (150M, 150C) to perform the initial adjustment. When determination part 101-1 determines that the first information indicates that the initial adjustment of first image forming unit 150K has not been completed and that the second information indicates that second image forming unit 150Y (150M, 150C) corresponds to the used state, initial adjustment part 101-2 causes only black imaging unit 150K to perform the initial adjustment.

Update part 101-3 is realized by CPU 101, ROM 109, extension I/O 103, and the like. More specifically, update part 101-3 is realized as a control program stored in ROM 109 is once read into RAM 108, and the program stored in RAM 108 is executed on CPU 101, and an update instruction is transmitted to first storage part 151K and main body storage part 106-1 via extension I/O 103.

When the initial adjustment work of black imaging unit 150K is completed, update part 101-3 updates the first information stored in first storage part 151K to the content indicative of the initial adjustment completed state.

[Overall Operation]

Figure 7:
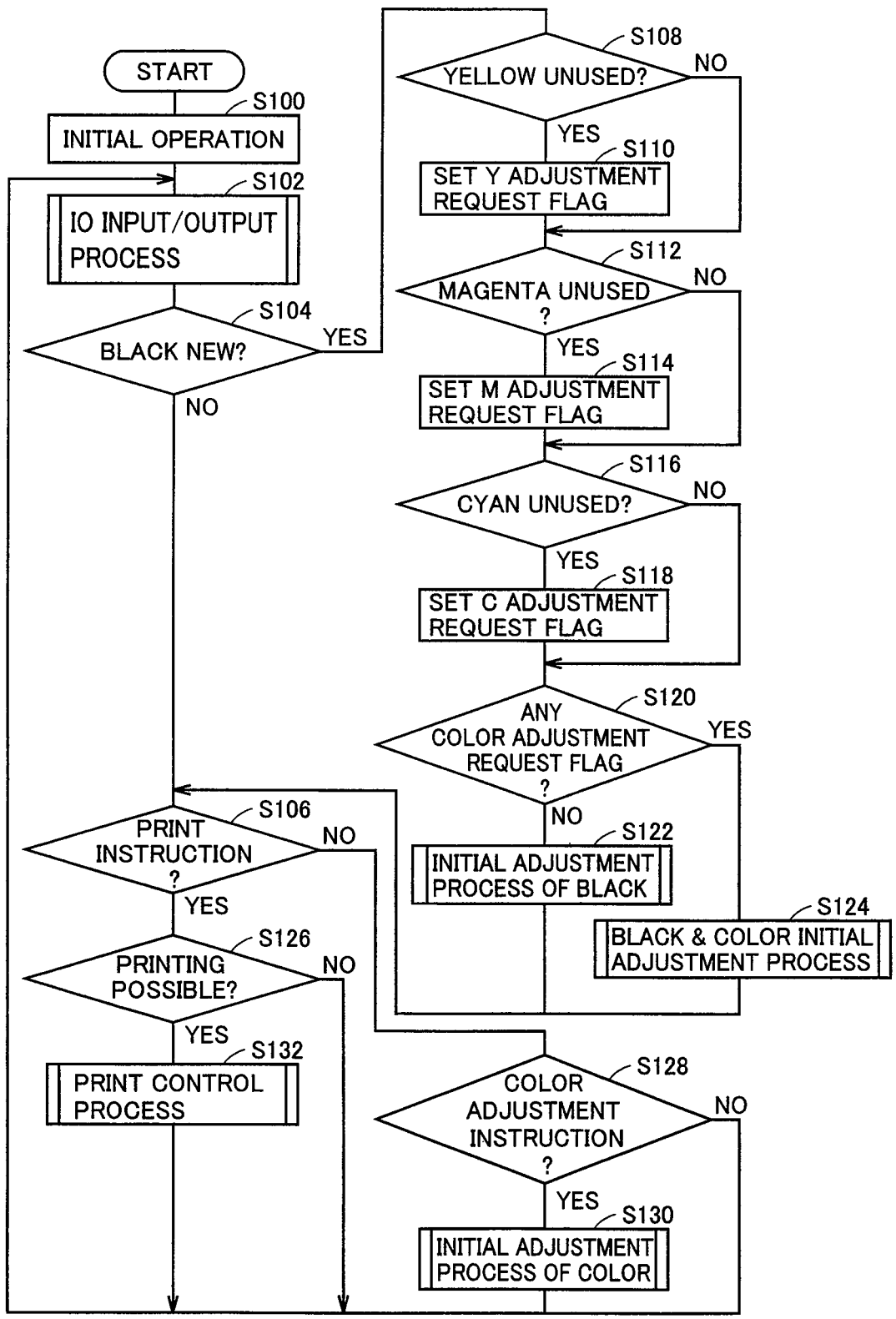
FIG. 7 is a flowchart showing an overall operation of an MFP as an exemplary image forming apparatus.

Next, an overall operation in MFP 1 according to the present embodiment is described. FIG. 7 is a flowchart showing the overall operation in MFP 1 as an exemplary image forming apparatus. As shown in FIG. 7, when the power supply of MFP 1 is turned on, well-known various initial operations in the MFP are performed (step 100; hereinafter step is abbreviated as S), and a sub-routine of an input/output process in extension I/O 103 is executed (S102).

Figure 8:
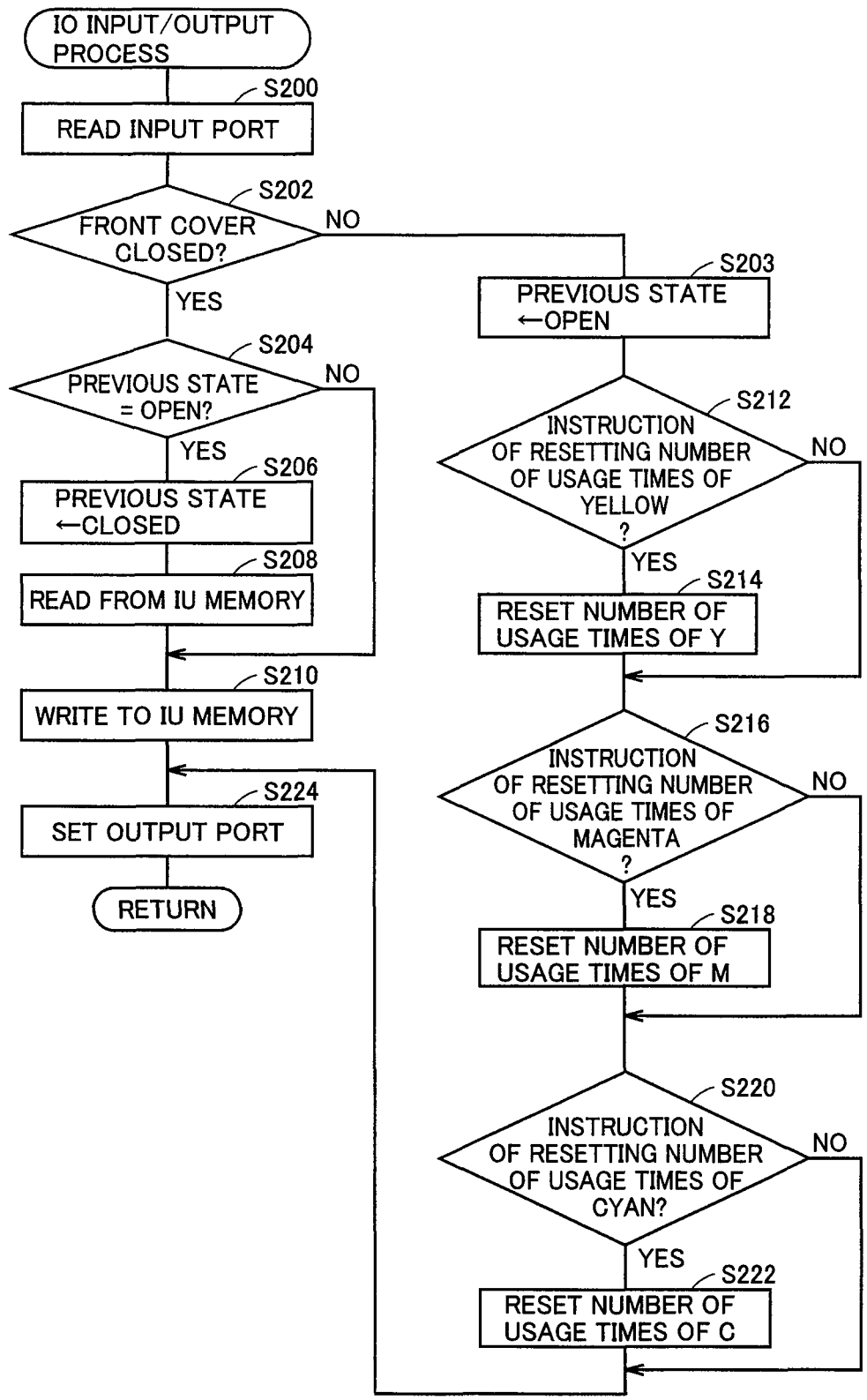
FIG. 8 is a flowchart showing a processing procedure of an input/output process.

FIG. 8 is a flowchart showing a processing procedure of the input/output process (S102), showing the sub-routine of the overall operation shown in FIG. 7. As shown in FIG. 8, CPU 101 firstly recognizes an input port via extension I/O 103 (S200). Then, CPU 101 detects whether or not the front cover of MFP 1 is closed via door switch 110 (S202). When the front cover is closed (YES in S202), CPU 101 reads the open/closed state of the cover stored in RAM 108 (the open/closed state of the front cover having been detected in the immediately preceding operation cycle (timing); hereinafter referred to as the "previous state"), and determines whether or not the previous state is "open" (S204).

When the previous state is "open", that is, when the front cover was open when previously detected (YES in S204), CPU 101 updates the previous state stored in RAM 108 to "closed" (S206). Then, CPU 101 reads information as to whether or not the initial adjustment has been completed (first information) and other information stored in first storage part 151K, from first storage part 151K via extension I/O 103. Then, CPU 101 stores the information in RAM 108 (S208), and various update information, having been stored in RAM 108, in first storage part 151K (S210). On the other hand, when the previous state is "closed" (NO in S204), CPU 101 stores various update information, having been stored in RAM 108, in first storage part 151K (S210). Thereafter, CPU 101 sets the output port via extension I/O 103 (S224).

On the other hand, when the front cover is open in S202 (NO in S202), CPU 101 updates the previous state stored in RAM 108 to "open" (S203). Thereafter, CPU 101 determines whether an instruction of resetting the usage history (the number of usage times) of yellow imaging unit 150Y is received from the user via IF controller 102 with a not-shown operation panel (S212). When the instruction of resetting yellow is received (YES in S212), CPU 101 resets the usage history (the number of usage times) of yellow stored in main body storage part 106-1 (S214), and thereafter determines whether or not an instruction of resetting the usage history (the number of usage times) of magenta imaging unit 150M is received (S216). On the other hand, when the instruction of resetting yellow is not received (NO in S212), CPU 101 determines whether or not an instruction of resetting the usage history (the number of usage times) of magenta imaging unit 150M is input with the operation panel (S216).

When the instruction of resetting magenta is received (YES in S216), CPU 101 resets the usage history (the number of usage times) of magenta stored in main body storage part 106-1 (S218), and thereafter determines whether or not an instruction of resetting the usage history (number of usage times) of cyan imaging unit 150C is received (S220). On the other hand, when the instruction of resetting magenta is not received (NO in S216), CPU 101 determines whether or not an instruction of resetting the usage history (the number of usage times) of cyan imaging unit 150C is received (S220).

When the instruction of resetting cyan is received (YES in S220), CPU 101 resets the usage history (the number of usage times) of cyan (S222), and thereafter CPU 101 sets the output port via extension I/O 103 (S224). On the other hand, when the instruction of resetting cyan is not received (NO in S220), CPU 101 sets the output port via extension I/O 103 (S224).

Referring to FIG. 7 again, when input/output process 102 is completed (S102), CPU 101 functioning as determination part 101-1 determines whether or not black imaging unit 150K is new, based on the first information stored in RAM 108 (S104). Herein, "black imaging unit 150K is new" means that the first information indicates the initial adjustment uncompleted state of black imaging unit 150K, and "black imaging unit 150K is not new" means that the first information indicates the initial adjustment completed state of black imaging unit 150K.

When black imaging unit 150K is new (YES in S104), CPU 101 determines whether or not yellow imaging unit 150Y is in the unused state (S108). Herein, "the imaging unit is in the unused state" means that the number of usage times of imaging unit 150Y (150M, 150C) is smaller than the preset number of times (e.g., ten times). "The imaging unit is in the used state" means that the number of usage times of imaging unit 150Y (150M, 150C) is not smaller than the preset number of times.

When yellow imaging unit 150Y is in the unused state (YES in S108), CPU 101 sets an initial adjustment request flag of yellow (stores "1" at a prescribed address on RAM 108) (S110), and thereafter determines whether magenta imaging unit 150M is in the unused state (S112). When yellow imaging unit 150Y is in the used state (not in the unused state) (NO in S108), CPU 101 determines whether or not magenta imaging unit 150M is in the unused state (S112).

When magenta imaging unit 150M is in the unused state (YES in S112), CPU 101 sets an initial adjustment request flag of magenta (S114), and thereafter determines whether cyan imaging unit 150C is in the unused state (S116). When magenta imaging unit 150M is in the used state (NO in S112), CPU 101 determines whether or not cyan imaging unit 150C is in the unused state (S116).

When cyan imaging unit 150C is in the unused state (YES in S116), CPU 101 sets an initial adjustment request flag of cyan (S118). CPU 101 functioning as initial adjustment part 101-2 determines whether or not the initial adjustment request flag corresponding to any color imaging unit 150Y (150M, 150C) is set (S120). When cyan imaging unit 150C is in the used state (NO in S116), CPU 101 determines whether or not the initial adjustment request flag corresponding to any color imaging unit 150Y (150M, 150C) is set (S120).

When the initial adjustment request flag corresponding to any color imaging unit 150Y (150M, 150C) is set (YES in S120), CPU 101 performs an initial adjustment process of each of black imaging unit 150K and color imaging unit 150Y (150M, 150C) having its initial adjustment request flag set (determined to be in the unused state) (S124). When none of the initial adjustment request flags corresponding to color imaging units 150Y 150M, and 150C are set (NO in S120), CPU 101 performs an initial adjustment process only of black imaging unit 150K (S122). Each initial adjustment process will be described later.

On the other hand, when black imaging unit 150K is not new in S104 (NO in S104), CPU 101 determines whether or not there is an input of print instruction by the user (S106). For example, CPU 101 determines whether or not a print start key on the operation panel is pressed via IF controller 102 and keyboard controller 193. When the print instruction is input (YES in S106), whether printing is possible or not is determined (S126). Herein, the state where "printing is not possible" means the state where MFP 1 cannot perform printing operation such as during the warm-up of MFP 1 itself or image forming units 150K, 150Y, 150M and 150C. When printing is possible (YES in S126), image forming units 150K, 150Y, 150M, and/or 150C perform print processing (S132), and thereafter the step of input/output process (S102) is again performed.

When the print instruction is not inputted (NO in S106), CPU 101 determines whether or not an instruction of initial adjustment of color imaging units 150Y, 150M, and 150C is received from the user (S128). When the initial adjustment instruction is received (YES in S128), the initial adjustment process of color image forming units 150Y, 150M and 150C of which initial adjustment instruction has been inputted is performed (S130), and thereafter the step of input/output process (S102) is again performed. The initial adjustment process will be described later.

[Initial Adjustment Process of Black Imaging Unit 150K Only]

In step S120 of FIG. 7, when none of the initial adjustment request flags corresponding to color image forming units 150Y, 150M and 150C are set, CPU 101 functioning as initial adjustment part 101-2 starts the initial adjustment process only of black imaging unit 150K (S122).

Figure 9:
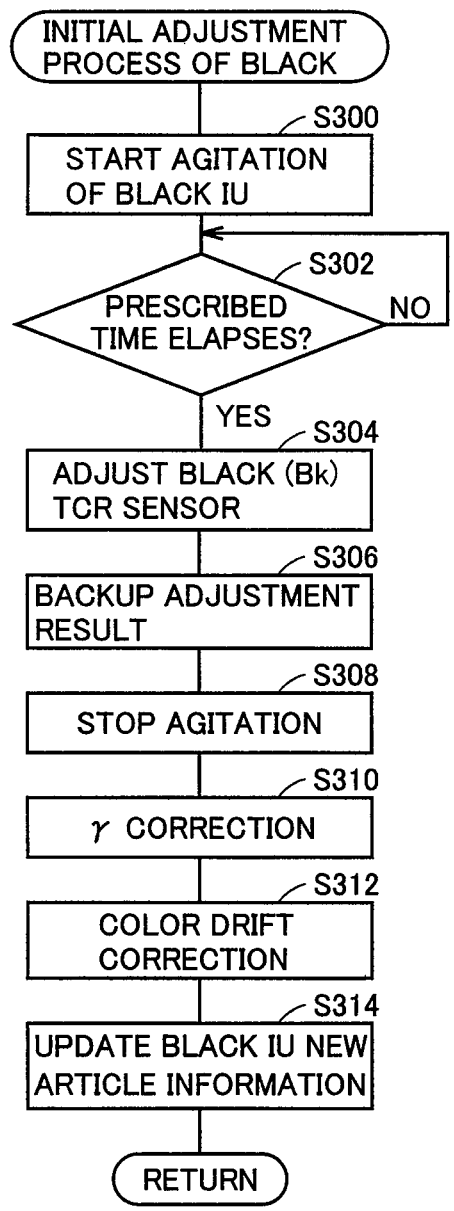
FIG. 9 is a flowchart showing a processing procedure of an initial adjustment process only for a black imaging unit.

FIG. 9 is a flowchart showing a processing procedure of the initial adjustment process of black imaging unit 150K only (S122). First, when CPU 101 determines that none of the initial adjustment requesting flags corresponding to color image forming units 150Y, 150M and 150C are set, as shown in FIG. 9, CPU 101 causes black imaging unit 150K to start a process of agitating toner and carrier (S300). More specifically, in response to the request of agitation process transmitted from CPU 101 via extension I/O 103, agitation screws 55K and 56K rotate and the toner and carrier of black imaging unit 150K are agitated.

Then, when a preset first prescribed time elapses since the start of agitation (S302), an adjustment of black TCR sensor 54K is performed (S304), and the adjustment result is stored in RAM 108 (S306). Thereafter, when a preset second prescribed time elapses since the start of agitation, the agitation process is stopped (S308). Thereafter, based on the information read from first storage part 151K to RAM 108, CPU 101 performs γ correction (S310), and thereafter CPU 101 performs color drift correction (S312). CPU 101 updates the new article information of the black imaging unit stored in RAM 108. (S314).

In the present embodiment, the adjustment of TCR sensor 54K is performed as follows. That is, since the TC ratio (Toner/Carrier ratio) of a new imaging unit is known, the control voltage provided to TCR sensor 54K is varied to determine the control voltage that provides a sensor output that is preset corresponding to the TC ratio.

For example, when the control voltage providing the TC ratio of 7% and the sensor output of 2.5V is to be determined, CPU 101 gradually increases the control voltage provided to TCR sensor 54K from 0V. When the adjustment is performed using a DA converter (digital to analog converter) of 8-bit having the maximum value of 5V, one step corresponds to about 19.6 mv. Therefore, CPU 101 increases the control voltage from 0V by 19.6 mv (one step). Then, when the range of the target output value of TCR sensor 54K is 2.5±0.1V, CPU 101 determines the control voltage output value (V1) providing the TCR sensor 54K output value of 2.4V and the control voltage output value (V2) providing the value exceeding 2.6V, and outputs (V1+V2)/2 to RAM 108 as the control voltage adjustment value.

γ correction refers to the work of CPU 101 determining the content of γ table stored in RAM 108 or main body backup memory 106. Herein, the γ table is the table for compensating for the nonlinearity in the concentration of an actually formed image relative to the tone of the image from the minimum to maximum concentrations, in other words, the change in the tone of the image data. The content of γ table can roughly be determined by CPU 101 detecting the toner concentration of the pattern image formed on the surface of the photoconductor drum.

The γ table can be determined by the following method as an example. When a 10-bit DA converter is used, CPU 101 selects a plurality of types of exposure amount out of 1024 ($2^{10}$) types of exposure amount that can be specified by the DA converter. For each exposure amount, an electrostatic latent image is formed on the surface of photoconductor drum 51K, which is developed by toner and transferred on transfer belt 41. Based on the result of detection of the toner concentration of the transferred pattern image, CPU 101 determines the content of the tone table of 256 levels, ranging from 0-tone level to 255-tone level. Here, when the output of the DA converter being 0 corresponds to 0-tone level and the output of the DA converter being maximum of 1024 corresponds to 255-tone level, CPU 101 selects, out of 1024 types, the output value of the DA converter providing best linearity of the concentration of the actually formed image for 0-tone level to 255-tone level, and determines the content of γ table based on the selected output value. It is noted that the each image stabilizing control briefly described above is of well-known technique.

Color drift correction refers to a resist correction process for eliminating displacement among the colors. The resist correction refers to the process performed by CPU 101 or the like detecting, for each color, the position on transfer belt 41 of a prescribed resist mark transferred on transfer belt 41, and correcting for, for example, the timing of exposure (image writing) on the photoconductor drum based on the detection result so that the positional displacement among the colors is eliminated. It is noted that the detail of the resist correction is also of well-known technique.

[Initial Adjustment Process of Each of Black Imaging Unit 150K and Color Imaging Unit 150Y (150M, 150C)]

In S120 in FIG. 7, when the initial adjustment request flag corresponding to any color imaging unit is set, CPU 101 functioning as initial adjustment part 101-2 simultaneously performs an initial adjustment process of each of black imaging unit 150K and color imaging unit 150Y (150M, 150C) having its initial adjustment request flag set (S124).

Figure 10:
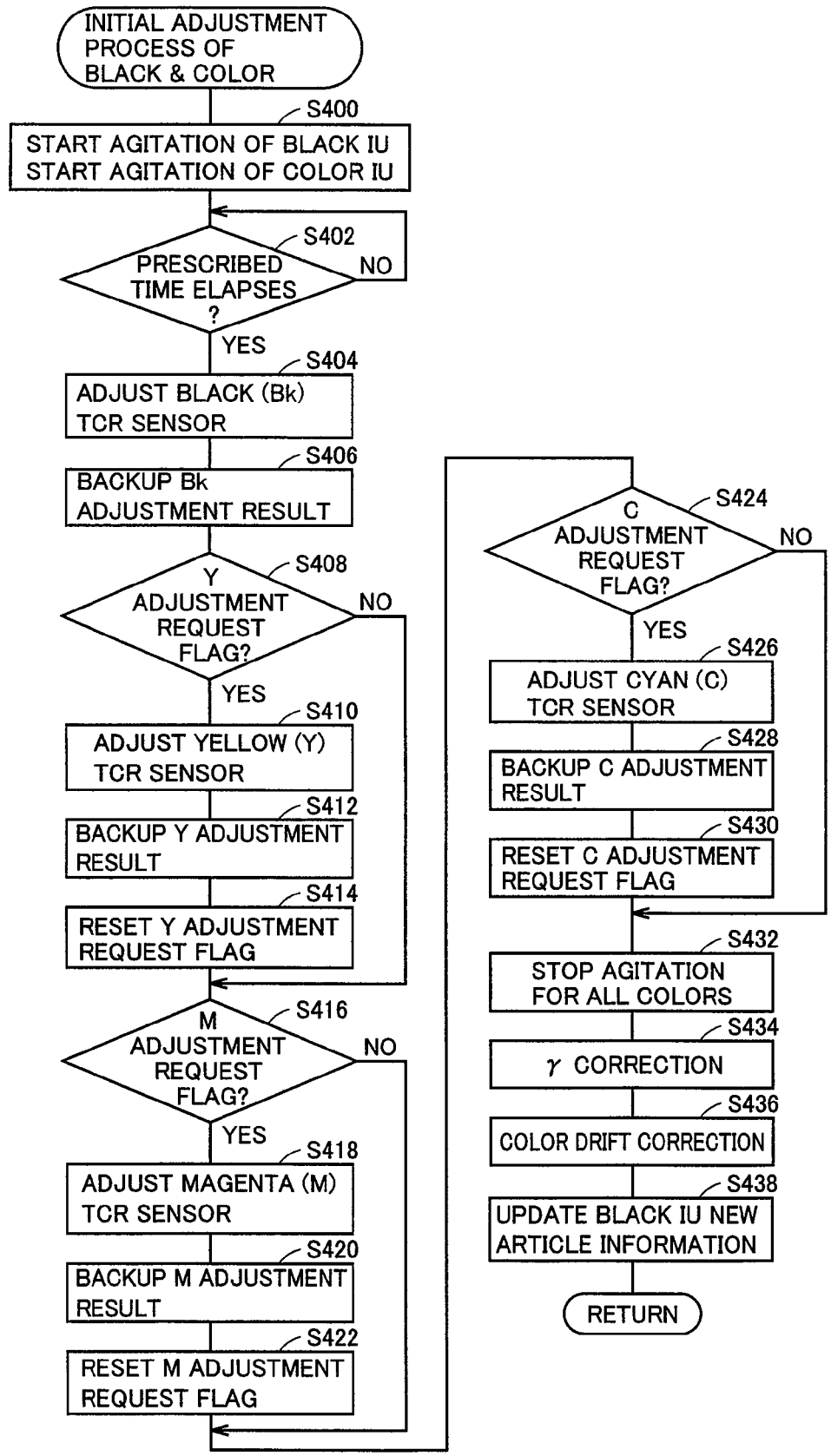
FIG. 10 is a flowchart showing a processing procedure of an initial adjustment process for each of the black imaging unit and color imaging units.

FIG. 10 is a flowchart showing a processing procedure of the initial adjustment process of each of black imaging unit 150K and color imaging unit 150Y (150M, 150C) (S124). As shown in FIG. 10, first, CPU 101 recognizes color imaging unit 150Y (150M, 150C) having its initial adjustment request flag set, and starts a process of agitating toner and carrier of each black imaging unit 150K and color imaging unit 150Y (150M, 150C) having its initial adjustment request flag set (S400). Then, when a preset prescribed time elapses (S402), CPU 101 performs an adjustment of black TCR sensor 54K (S404), and stores the adjustment result in main body storage part 106-1 (S406).

Then, CPU 101 determines whether or not the initial adjustment request flag of yellow is set (S408). When the initial adjustment request flag of yellow is set (YES in S408), CPU 101 performs an adjustment of yellow TCR sensor 54Y (S410). CPU 101 stores the adjustment result in main body storage part 106-1 (S412), and resets the initial adjustment request flag of yellow (S414). Thereafter, CPU 101 determines whether or not the initial adjustment request flag of magenta is set (S416). On the other hand, when the initial adjustment request flag of yellow is not set (NO in S408), CPU 101 determines, without performing the adjustment of TCR sensor 54Y, whether or not the initial adjustment request flag of magenta is set (S416).

Then, when the initial adjustment request flag of magenta is set (YES in S416), CPU 101 performs an adjustment of magenta TCR sensor 54M (S418). CPU 101 stores the adjustment result in main body storage part 106-1 (S420), and resets the initial adjustment request flag of magenta (S422). Thereafter, CPU 101 determines whether or not the initial adjustment request flag of cyan is set (S424). On the other hand, when the initial adjustment request flag of magenta is not set (NO in S416), CPU 101 determines, without performing the adjustment of magenta TCR sensor 54M, whether or not the initial adjustment request flag of cyan is set (S424).

Then, when the initial adjustment request flag of cyan is set (YES in S424), CPU 101 performs an adjustment of cyan TCR sensor 54C (S426). CPU 101 stores the adjustment result in main body storage part 106-1 (S428), and resets the initial adjustment request flag of cyan (S430). Thereafter, CPU 101 stops the agitation process in every imaging unit 150 (S432). On the other hand, when the initial adjustment request flag of cyan is not set (NO in S424), CPU 101 stops, without performing the adjustment of cyan TCR sensor 54C, the agitation process in every imaging unit 150 (S432).

Thereafter, based on the information stored in main body backup memory 106, CPU 101 performs γ correction (S434), and thereafter performs color drift correction (S436), and updates the new article information of the black imaging unit stored in RAM 108 (S438).

As above, in the present embodiment, even though color imaging units 150Y, 150M and 150C are not each provided with a first storage part, owing to CPU 101 capable of automatically and simultaneously performing the agitation process of each of black imaging unit 150K and color imaging unit 150Y (150M, 150C) having initial adjustment request flag set, the initial adjustment work time can be reduced and the user operation for the initial adjustment work can be simplified.

[Initial Adjustment Process of Color Imaging Units 150Y, 150M and 150C Only]

MFP 1 according to the present embodiment is provided with the following functions. That is, in S128 in FIG. 7, when an initial adjustment instruction of color imaging unit 150Y (150M, 150C) is inputted by a user via the operation panel, CPU 101 functioning as initial adjustment part 101-2 performs the initial adjustment process only of color imaging unit 150Y (150M, 150C) of which initial adjustment instruction has been inputted (S130).

Figure 11:
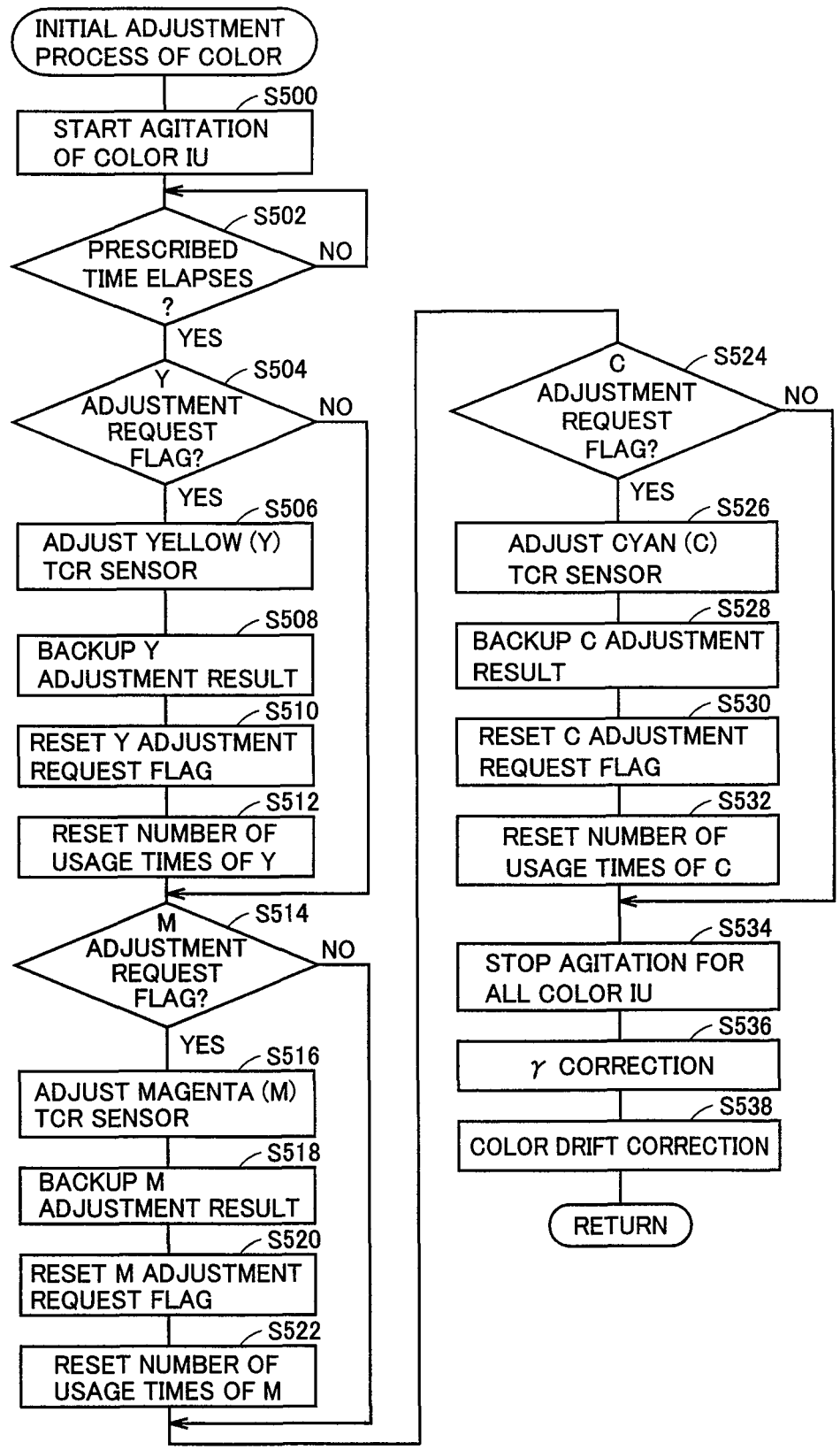
FIG. 11 is a flowchart showing a processing procedure of an initial adjustment process only for each of the color imaging units.

FIG. 11 is a flowchart showing a processing procedure of the initial adjustment process of color imaging unit 150Y

(150M, 150C) only (S130). As shown in FIG. 11, CPU 101 determines color imaging unit 150Y (150M, 150C) targeted by the initial adjustment instruction inputted with the operation panel via keyboard controller 193 and IF controller 102, and then sets the initial adjustment request flag of color imaging unit 150Y (150M, 150C) being the target of the initial adjustment instruction. Then, CPU 101 starts a process of agitating toner and carrier in color imaging unit 150Y (150M, 150C) being the target of initial adjustment instruction (S500).

Then, when a preset prescribed time elapses (S502), CPU 101 determines whether or not the initial adjustment request flag of yellow is set (S504). When the initial adjustment request flag of yellow is set (YES in S504), CPU 101 performs an adjustment of yellow TCR sensor 54Y (S506). CPU 101 stores the adjustment result in main body storage part 106-1 (S508), and resets the initial adjustment request flag of yellow (S510). Thereafter, CPU 101 resets the usage history of yellow in main body storage part 106-1 (S512), and determines whether or not the initial adjustment request flag of magenta is set (S514). On the other hand, when the initial adjustment request flag of yellow is not set (NO in S504), CPU 101 determines, without performing the adjustment of yellow TCR sensor 54Y, whether or not the initial adjustment request flag of magenta is set (S514).

Then, when the initial adjustment request flag of magenta is set (YES in S514), CPU 101 performs an adjustment of magenta TCR sensor 54M (S516). CPU 101 stores the adjustment result in main body storage part 106-1 (S518), and resets the initial adjustment request flag of magenta (S520). Thereafter, CPU 101 resets the usage history of magenta in main body storage part 106-1 (S522), and determines whether or not the initial adjustment request flag of cyan is set (S524). On the other hand, when the initial adjustment request flag of magenta is not set (NO in S514), CPU 101 determines, without performing the adjustment of TCR sensor 54M, whether or not the initial adjustment request flag of cyan is set (S524).

Then, when the initial adjustment request flag of cyan is set (YES in S524), CPU 101 performs an adjustment of cyan TCR sensor 54C (S526). CPU 101 stores the adjustment result in main body storage part 106-1 (S528), and resets the initial adjustment request flag of cyan (S530). Thereafter, CPU 101 resets the usage history of cyan in main body backup memory 106 (S532), and stops the agitation process in every color imaging unit 150Y (150M, 150C) (S534). On the other hand, when the initial adjustment request flag of cyan is not set (NO in S524), CPU 101 stops, without performing the adjustment of TCR sensor 54C, the agitation process in every color imaging unit 150Y (150M, 150C) (S534).

Thereafter, based on the information stored in main body backup memory 106, CPU 101 performs γ correction (S536), and thereafter performs color drift correction (S538).

[Print Control Process]

As described above, referring to FIG. 7, when the user presses the print start key of the operation panel after the initial adjustment process is performed (S106) and CPU 101 determines that printing is possible (YES in S126), each part of MFP 1 performs a print control process (S132).

FIG. 12 is a flowchart showing a process procedure of the print control process. As shown in FIG. 12, based on the print instruction, image forming units 150K, 150Y, 150M and 150C perform printing (S600). Then, CPU 101 determines whether it is color printing or not (S602). When color printing is performed (YES in S602), update part 101-4 increments (+1) the usage history (the number of usage times) of imaging units 150Y, 150M and 150C of yellow, magenta, cyan stored in main body storage part 106-1 (S604, S606, S608). Then, the usage history (the number of usage times) of black imaging unit 150K read from first storage part 151K to RAM 108 is updated (S610).

CONCLUSION

The life of the color imaging units may sometimes be longer than that of the image forming apparatus, and therefore the color imaging units may not be replaced. Even when the replacement is carried out, it only occurs about once. On the other hand, the black imaging unit is frequently replaced by the user. That is, it is highly likely that a state where both the black imaging unit and color imaging units have not undergone an initial adjustment only occurs at the time of setup at the user's place after being shipped out of the factory. Exceptionally, both the color imaging units and black imaging unit may be replaced together because of any failure of the imaging units. However, this may be very rare.

The image forming apparatus according to the present embodiment has the function of determining whether or not the color imaging units are in the unused state even when the color imaging units do not have nonvolatile memory, and therefore it is capable of automatically performing an initial adjustment, thus drastically improving the operability.

More specifically, it is configured such that the life managing counter (usage history) in main body backup memory 106 for managing the life of each color imaging unit is used to determine whether or not the color imaging units are in the state where the initial adjustment has not been performed. The life managing counter of the color imaging units is set to zero or a small value around zero when shipped out from the factory. Accordingly, if the value of the life managing counter is not more than a prescribed value, the CPU determines that the color imaging units are not subjected to the initial adjustment.

Here, there may be a case where, even though the initial adjustment of each color imaging unit has been completed, color printing is not performed and the life managing counter maintains the value not more than the prescribed value. That is, care should be taken so that the initial adjustment of the color imaging units is not performed twice or more. Accordingly, in the image forming apparatus according to the present embodiment, only when the CPU determines that the initial adjustment of the black imaging unit has not been performed and the color imaging units are in the unused state, the initial adjustment of each color unit is performed.

At the time point where the initial adjustment of each of the black imaging unit and the color imaging units has been completed, the color imaging units are still in the unused state. That is, the usage history does not change by an initial adjustment. Accordingly, in the image forming apparatus according to the present embodiment, in order to prevent the initial adjustment of each color imaging unit from being performed again, only when the CPU determines that the initial adjustment of the black imaging unit has not been performed, the initial adjustment of each color imaging unit is performed.

Table 1 below shows the conditions for performing the initial adjustment of each imaging unit.

TABLE 1

| black IU initial adjustment completion state | color IU usage state | operation |
|---|---|---|
| uncompleted state | unused state | perform initial adjustment of color/black |
| completed state | unused state | do not perform initial adjustment |
| uncompleted state | used state | perform initial adjustment of black |
| completed state | used state | do not perform initial adjustment |

The image forming apparatus according to the present embodiment updates the first information as to whether the initial adjustment is performed as stored in the first storage part of the black imaging unit when the initial adjustment is performed. However, it does not update the usage history of the color imaging units stored in the body storage part of the image forming apparatus.

As above, according to the image forming apparatus according to the present embodiment, it becomes possible to improve the performance of setup (initial adjustment), while suppressing the costs of the imaging units.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
a main body including a main body storage part;
a first image forming unit removably attached to said main body, wherein said first image forming unit includes a first storage part storing first information indicative of whether or not an initial adjustment of said first imaging forming unit has been completed;
a second image forming unit removably attached to said main body, wherein said main body storage part stores second information indicative of a usage history of said second image forming unit, wherein the second image forming unit does not have a storage part storing second information;
a determination part determining whether or not said first information stored in said first storage part and said second information stored in said main body storage part satisfy respective prescribed conditions; and
an initial adjustment part causing said first and second image forming units to be agitated simultaneously as the initial adjustment when said first information indicates that the initial adjustment of said first image forming unit has not been completed and said second information indicates that the second image forming unit corresponds to an unused state.

2. The image forming apparatus according to claim 1, wherein
said initial adjustment part causes only said first image forming unit to perform the initial adjustment when said first information indicates that the initial adjustment of said first image forming unit has not been completed and said second information indicates that said second image forming unit corresponds to a used state.

3. The image forming apparatus according to claim 1, wherein
said usage history includes number of usage times of said second image forming unit, and
said determination part determines that said second image forming unit corresponds to the unused state when said number of usage times is smaller than a preset threshold value.

4. The image forming apparatus according to claim 1, further comprising
an update part updating, when the initial adjustment of said first image forming unit is completed, said first information stored in said first storage part to a content indicating that the initial adjustment of said first image forming unit has been completed.

5. The image forming apparatus according to claim 1, wherein
said first image forming unit is an image forming unit for black, and
said second image forming unit is an image forming unit for color.

6. An initial adjustment method for an image forming apparatus, wherein said image forming apparatus includes
a main body including a main body storage part,
a first image forming unit removably attached to said main body and including a first storage part, and
a second image forming unit removably attached to said main body,
said initial adjustment method comprising the steps of:
storing in said first storage part first information indicative of whether or not an initial adjustment of said first imaging forming unit has been completed;
storing in said main body storage part second information indicative of a usage history of said second image forming unit, wherein the second image forming unit does not have a storage part storing second information;
determining whether or not said first information stored in said first storage part and said second information stored in said main body storage part satisfy respective prescribed conditions; and
causing said first and second image forming units to be agitated simultaneously as the initial adjustment when said first information indicates that the initial adjustment of said first image forming unit has not been completed and said second information indicates that the second image forming unit corresponds to an unused state.

7. The initial adjustment method according to claim 6, wherein
said step of causing said first and second image forming units to perform the initial adjustment includes a step of causing only said first image forming unit to perform the initial adjustment when said first information indicates that the initial adjustment of said first image forming unit has not been completed and said second information indicates that said second image forming unit corresponds to a used state.

8. The initial adjustment method according to claim 6, wherein
said usage history includes number of usage times of said second image forming unit, and
said step of determining includes a step of determining that said second image forming unit corresponds to the unused state when said number of usage times is smaller than a preset threshold value.

9. The initial adjustment method according to claim 6 further comprising a step of
updating, when the initial adjustment of said first image forming unit is completed, said first information stored in said first storage part to a content indicating that the initial adjustment of said first image forming unit has been completed.

10. The initial adjustment method according to claim 6, wherein
   said first image forming unit is an image forming unit for black, and
   said second image forming unit is an image forming unit for color.

11. A non-transitory computer readable medium storing a program for causing an image forming apparatus to perform an initial adjustment, wherein said image forming apparatus includes
   a main body including a main body storage part,
   a first image forming unit removably attached to said main body and including a first storage part,
   a second image forming unit removably attached to said main body, and
   a controller controlling operations of said image forming apparatus,
   said program causing said controller to perform the steps of:
   storing in said first storage part first information indicative of whether or not an initial adjustment of said first imaging forming unit has been completed;
   storing in said main body storage part second information indicative of a usage history of said second image forming unit, wherein the second image forming unit does not have a storage part storing second information;
   determining whether or not said first information stored in said first storage part and said second information stored in said main body storage part satisfy respective prescribed conditions; and
   causing said first and second image forming units to be agitated simultaneously as the initial adjustment when said first information indicates that the initial adjustment of said first image forming unit has not been completed and said second information indicates that the second image forming unit corresponds to an unused state.

12. The non-transitory computer readable medium according to claim 11, wherein
   said step of causing said first and second image forming units to perform the initial adjustment includes a step of causing only said first image forming unit to perform the initial adjustment when said first information indicates that the initial adjustment of said first image forming unit has not been completed and said second information indicates that said second image forming unit corresponds to a used state.

13. The non-transitory computer readable medium according to claim 11, wherein
   said usage history includes number of usage times of said second image forming unit, and
   said step of determining includes a step of determining that said second image forming unit corresponds to the unused state when said number of usage times is smaller than a preset threshold value.

14. The non-transitory computer readable medium according to claim 11, wherein
   said program further causes said controller to perform a step of
   updating, when the initial adjustment of said first image forming unit is completed, said first information stored in said first storage part to a content indicating that the initial adjustment of said first image forming unit has been completed.

15. The non-transitory computer readable medium according to claim 11, wherein
   said first image forming unit is an image forming unit for black, and
   said second image forming unit is an image forming unit for color.

* * * * *